United States Patent [19]

Jean-Marc

[11] Patent Number: 5,244,971
[45] Date of Patent: Sep. 14, 1993

[54] GRAFT POLYMERS FOR USE IN ENGINEERING THERMOPLASTIC BLENDS

[75] Inventor: Dekoninck Jean-Marc, Melin, Belgium

[73] Assignee: Exxon Chemical Patents Inc., Linden, N.J.

[21] Appl. No.: 733,499

[22] Filed: Jul. 22, 1991

[51] Int. Cl.$^5$ .............................................. C08G 63/48
[52] U.S. Cl. ...................... 525/64; 525/66; 525/67; 525/68; 525/69; 525/71; 525/72; 525/74
[58] Field of Search ................. 525/64, 66, 67, 68, 525/69, 71, 72, 74

[56] References Cited

U.S. PATENT DOCUMENTS

| | | | |
|---|---|---|---|
| 2,465,319 | 3/1949 | Whinfield et al. | 526/71 |
| 3,047,539 | 7/1962 | Pengilly et al. | 528/285 |
| 3,330,794 | 7/1967 | Gallagher | 428/413 |
| 3,448,174 | 6/1969 | Loveless et al. | 525/285 |
| 3,492,227 | 1/1970 | Kolaian et al. | 252/8.5 |
| 3,551,518 | 12/1970 | Pornin | 525/244 |
| 3,708,555 | 1/1973 | Gaylord | 525/285 |
| 3,761,458 | 9/1973 | Heller et al. | 526/310 |
| 3,796,687 | 3/1974 | Collette et al. | 252/33 |
| 3,862,265 | 1/1975 | Steinkamp et al. | 525/285 |
| 3,884,882 | 5/1975 | Caywood, Jr. | 525/205 |
| 3,962,265 | 6/1976 | Johnston | 546/300 |
| 4,017,557 | 4/1977 | Hammer et al. | 525/66 |
| 4,017,669 | 4/1977 | Collette et al. | 526/169 |
| 4,026,967 | 5/1977 | Flexman, Jr. et al. | 525/52 |
| 4,068,057 | 1/1978 | Engel et al. | 526/49 |
| 4,139,417 | 2/1979 | Marie et al. | 252/51.5 A |
| 4,144,181 | 3/1979 | Elliott et al. | 252/33 |
| 4,160,739 | 7/1979 | Stambaugh et al. | 252/34 |
| 4,161,452 | 7/1979 | Stambaugh et al. | 252/34 |
| 4,388,202 | 6/1983 | Nagano et al. | 252/52 A |
| 4,423,196 | 12/1983 | Arlt et al. | 526/72 |
| 4,506,056 | 3/1985 | Gaylord | 524/445 |
| 4,569,969 | 2/1986 | Jones et al. | 525/74 |
| 4,644,034 | 2/1987 | Tanaka et al. | 525/71 |
| 4,742,116 | 5/1989 | Schepers et al. | 525/74 |
| 4,749,505 | 6/1988 | Chung et al. | 252/51.5 A |
| 4,895,897 | 1/1990 | Kaufman | 525/67 |
| 4,950,721 | 8/1990 | Dias et al. | 525/340 |
| 4,987,200 | 1/1991 | Datta et al. | 526/75 |
| 5,115,055 | 5/1992 | Neugebauer | 525/68 |

FOREIGN PATENT DOCUMENTS

| | | |
|---|---|---|
| 0366320A2 | 5/1990 | European Pat. Off. . |
| 0366412A2 | 5/1990 | European Pat. Off. . |
| 4633536 | 1/1973 | Japan . |
| A1-9105008 | 4/1991 | World Int. Prop. O. . |
| A1-9108263 | 6/1991 | World Int. Prop. O. . |

OTHER PUBLICATIONS

Journal of Applied Polymer Science, vol. 20, 1619-1626 (1976).

C. D. Chow, "Molecular Weights of Styrene-Maleic Anhydride Copolymers".

A. W. Hanson and R. L. Zimmerman, Industrial Engineering Chemistry, vol. 49, p. 1803, Nov. 1957 "Continuous Recycle Copolymerization".

Encyclopedia of Polymer Science and Technology, vol. 10, pp. 710 to 727, 1969 Interscience, New York.

Encyclopedia of Polymer Science and Engineering, vol. 13, pp. 262-264 "Polyurethanes".

Kirk-Othmer, Encyclopedia of Polymer Science and Technology, vol. 10, pp. 392-414 "Polyamide Fibers".

*Primary Examiner*—John Kight, III
*Assistant Examiner*—Rachel Johnson
*Attorney, Agent, or Firm*—W. G. Muller; J. E. Schneider

[57] ABSTRACT

Graft polymers for use as compatibilizers and/or modifiers for engineering thermoplastic compositions are provided comprising the reaction product of functionalized thermoplastic polymers with styrene-maleic anhydride copolymer. The functionalized thermoplastic polymers are based typically on polyolefin polymers and contain at least one functional group reactive either with styrene-maleic anhydride copolymer, or with direactive linking groups reactive with both of the functionalized thermoplastic polymer and styrene-maleic anhydride copolymer. The engineering thermoplastic compositions to be modified include polar engineering thermoplastics and the non-polar engineering thermoplastics based on styrene.

7 Claims, No Drawings

GRAFT POLYMERS FOR USE IN ENGINEERING THERMOPLASTIC BLENDS

This invention relates to the property modification of engineering thermoplastics, in particular to graft polymers of use inter alia as modifiers and compatibilizing agents, to a method for their manufacture and to engineering thermoplastic blends comprising such graft polymers. In particular the invention relates to graft polymers comprising at least one styrene-maleic anhydride copolymer segment.

TECHNICAL FIELD

Engineering thermoplastics such as poly(styrene-acrylonitrile) copolymer, polycarbonates and polyesters have excellent physical properties such as strength and stiffness but it is often required to blend or alloy these with other thermoplastics such as polyolefins to improve their impact toughness or to reduce their overall cost. However, the components of such blends are usually highly incompatible; it is thus common practice to include a compatibilizer which functions to improve the adhesion between the incompatible components and/or to modify the surface tension at the phase boundaries. Alternatively, a modifier may be blended with the engineering thermoplastic, such a modifier comprising typically, a polyolefin carrying groupings compatible with the engineering thermoplastic and thus enhancing interphase adhesion.

There is thus a requirement to provide functional groups on a wide range of polymers, which functional groups can assist in attachment to the polymer of compatibilising or modifying moieties. This has commonly been attempted by grafting or copolymerizing active groupings into the polymers. Thus, for example, polyolefins are commonly maleinised, that is reacted with maleic acid or maleic anhydride to provide such active groups while often also incorporating styrene to enhance compatibility with engineering thermoplastics.

The present invention is based on the concept of reacting a functionalized thermoplastic polymer and styrene maleic anhydride copolymer (SMA) to form a graft polymer useful in the compatibilization or toughening of engineering thermoplastics. It has been found that by utilizing previously prepared SMA, the properties such as the molecular weight, molecular weight distribution, comonomer content and comonomer distribution, of the SMA segment of the graft polymer can be predictably tailored, even under the difficult conditions of melt processing reactions which are otherwise economically and environmentally attractive.

BACKGROUND INFORMATION

There is a significant amount of description in the art addressing graft polymers, and their methods of preparation, comprising SMA-graft segments. For example, U.S. Pat. No. 3,708,555 addresses the thermal addition reaction of maleic anhydride monomer in liquid styrene with fluid polymers having active hydrogen atoms. Such substrate polymers are said to include such polymers as polypropylene, polyethylene, ethylenepropylene rubber, cispolybutadiene, acrylonitrile-butadienestyrene, and others having labile or active hydrogens. The purpose of the invention is said to be the provision of carboxyl-containing polymers suitable for melt extrusion as films, sheets, tubes, fibers, etc. having further utility in composites or for dyeability. In one embodiment, the carboxylation reaction is to be conducted in a melt extruder. Similarly, Japanese Open Publication 4800686 addresses the preparation of a propylene-maleic anhydride-styrene graft polymer by introducing polypropylene into maleic anhydride monomer impregnated with 15% benzoyl peroxide in benzene, heated in a 20 vol % styrene solution in toluene.

Additionally certain polymer blends comprising SMA graft compound containing polymers are known. EP-A-336 320 addresses polypropylene blend compositions comprising such components as polypropylene, maleinised polypropylene, polyester resin, epoxy-containing copolymer, ethylenepropylene (-diene copolymer) rubber and modified ethylenic copolymer rubber obtained by graft copolymerizing an unsaturated carboxylic acid (e.g. maleic anhydride) and an unsaturated aromatic monomer (e.g., styrene) onto the rubber. EP-A-335 3394 addresses a thermoplastic resin composition comprising a modified polypropylene obtained by graft copolymerizing an unsaturated carboxylic acid and unsaturated aromatic monomer onto polypropylene, optionally with unmodified polypropylene, a polyester resin, an epoxy group containing copolymer and a modified ethylene- olefin (-nonconjugated diene) copolymer rubber. Styrene is said to be the preferred unsaturated aromatic monomer and maleic anhydride is said to be the preferred carboxylic acid (derivative). Both (maleic anhydride-styrene) -modified polypropylene and -modified ethylene-propylene copolymer rubber are prepared by peroxide-initiated graft copolymerization.

U.S. Pat. No. 4,895,897 describes impact modifiers for polycarbonates comprising the reaction product of an ethylene-propylene elastomer having at least one reactive polar group, typically a hydroxy, epoxy, amine, carboxy or carboxylic-anhyride group, with an oxazoline functionalised polystyrene. The mode of interaction of the polar group and the oxazoline group is not stated but it appears that a cross-linking chain containing at least one nitrogen atom is formed between the ethylene elastomer and the polystyrene.

U.S. Pat. No. 4,742,116 describes a thermoplastic moulding compound based on a rubber-modified copolymer in admixture with ethylene-propylene copolymer (EP) or ethylene-propylenediene terpolymer (EPDM) rubber; the rubber modified copolymer is derived from styrene or alpha-methyl styrene and maleic anhydride, an acrylate or acrylonitrile and is bonded to functionalised EP or EPDM rubber carrying hydroxyl, amide or amine groups.

As indicated above, the graft incorporation of SMA-copolymer segments onto a substrate polymer by graft copolymerization is known as is the potential use for such graft copolymers in various engineering thermoplastic resin blends. However, graft copolymerization, whether conducted by peroxide-initiated or heat-initiated radical formation is subject to several deficiencies. Particularly, it is well known that free-radical formation in the presence of polypropylene can be expected to cause significant molecular weight degradation via chain scission, and in the presence of ethylene-containing-polymers, can be expected to cause similar degradation or cross-linking and gelling in melt processing. Additionally, radical-initiated polymerization of styrene and maleic anhydride, in particular, typically leads to alternating (styrene-co-maleic anhydride) copolymer or copolymer segments. Thus potential improved compatibility to be obtained from pre-selecting SMA molecular weight, molecular weight distribution, comonomer content, comonomer distribution, and ratio of SMA to substrate polymer is largely impossible.

SUMMARY OF THE INVENTION

According to the present invention provided is the use of a graft copolymer comprising the reaction product of a functionalized thermoplastic polymer with styrene maleic anhydride copolymer, in the compatibilization or modification of an engineering thermoplastic blend composition, said engineering thermoplastic blend composition excluding those comprising 50 wt % or greater styrene maleic anhydride copolymer as the engineering thermoplastic.

The graft polymer is prepared by melt-reacting a thermoplastic polymer carrying a group reactive to styrene-maleic anhydride copolymer, or capable of in situ modification to be reactive with the styrene-maleic anhydride copolymer, with styrene-maleic anhydride copolymer prepared separately from and prior to the graft melt-reaction.

The advantages of melt processing reactions in minimising or eliminating the use of solvents and consequent environmental concerns as well as costly separation procedures are achieved by utilizing polymeric graft reactants capable of reaction under melt processing conditions. Additionally this process provides means whereby substrate polymers can be maintained largely without unwanted modification and the SMA graft segments can be pre-selected for optimal effectiveness in engineering thermoplastic blends.

DESCRIPTION OF THE INVENTION

This invention encompasses the use in the modification of engineering thermoplastic compositions, said blends excluding those comprising 50% or greater styrene maleic anhydride copolymer as the engineering thermoplastic, of a graft copolymer comprising the reaction product of a functionalized thermoplastic polymer with styrene maleic anhydride copolymer. Said reaction product includes both the direct product formed by reacting SMA copolymer with functionalized thermoplastic polymers capable of reaction with one or more carboxylic acid/anhydride moieties on SMA copolymer, as well as the indirect reaction product formed by reacting SMA copolymer with functionalized thermoplastic polymers capable of reaction with compounds or composition rendering the functionalized thermoplastic polymer capable of reaction with at least one carboxylic-acid/anhydride moiety on SMA copolymer. The engineering thermoplastic blend compositions of the invention comprise one or more engineering thermoplastics at least partially compatible with SMA copolymer, optionally containing one or more additional thermoplastic polymers at least partially compatible with the functionalized thermoplastic polymer, or at least one functionalized thermoplastic polymer if more than one is to be used.

The word "compatible" has a technological usage in the polymer industry which refers to whether an immiscible polymer blend tends to form a stable dispersion, one minimally subject to problems of gross separation or stratification. A "compatibilizer" is a polymer that has the characteristics or properties permitting it to stabilize or "compatibilize" a heterophase polymer blend.

(A) The Thermoplastic Polymer

The thermoplastic polymer for use in the engineering thermoplastic compositions unmodified or functionalized may, for example, be a polyolefin such as those formed from one or more $C_2$-$C_{20}$ alpha-olefins, optionally containing copolymerizable non-conjugated diolefins and/or vinyl monomers. Such polyolefins may be crystalline, partially crystalline or amorphous. Thus polypropylene, polyethylene, ethylenepropylene copolymers, EP rubber, EPDM rubber and polymers of any of these monomers with one more higher alpha-olefins, e.g., 1-butene, 1-hexene, 1-octene, etc., are suitable polyolefins. Additionally included are the polyethylene copolymer resins comprising one or more copolymerisable vinyl esters, acids, epoxies, etc. Throughout the specification, the term "copolymer" is used in its ASTM accepted definition of a polymer formed from two or more types of monomers.

As used in the specification and claims, the term "polypropylene" includes homopolymers of propylene as well as reactor copolymers of polypropylene (RCPP) which can contain about 1 to about 20 wt % ethylene or an alpha olefin comonomer of 4 to 20 carbon atoms. The polypropylene can be isotactic, syndiotactic or atactic polypropylene. The RCPP can be either a random or block copolymer. The density of the PP or RCPP can be about 0.8 to about 0.9 g/cc. Polypropylene containing copolymerized non-conjugated diolefins will also be particularly useful.

High density polyethylene (HDPE), useful as a polyolefin resin, has a density of about 0.941 to about 0.965 g/cc. High density polyethylene is an established product of commerce and its manufacture and general properties are well known to the art.

Polyethylene copolymer resins which can optionally be used in the compositions of this invention include polybutylene, LDPE, VLDPE and LLDPE as well as copolymers of ethylene with unsaturated esters of lower carboxylic acids. The term "polybutylene" generally refers to thermoplastic resins of both poly (1-butene) homopolymer and the copolymer with, for example, ethylene, propylene, pentene-1, etc. Polybutylene is manufactured via a stereo-specific Ziegler-Natta polymerization of monomer(s). Commercially useful products are of high molecular weight and isotacticity. A variety of commercial grades of both homopolymer and ethylene copolymer are available with melt indices that range from about 0.3 to about 20 g/10 min.

The term "low density polyethylene" or "LDPE" as used in the specification and claims means both low and medium density polyethylene having densities of about 0.91 to about 0.94 g/cc. The terms include linear polyethylene as well as copolymers of ethylene which are thermoplastic resins.

Linear low density polyethylene (LLDPE) is a relatively new class of low density polyethylene characterized by little, if any, long chain branching, in contrast to conventional LDPE. The processes for producing LLDPE are well known in the art and commercial grades of this polyolefin resin are available. Generally, it is produced in gas-phase fluidized bed reactors or liquid-phase solution process reactors; the former process can be carried out at pressures of about 100 to 300 psi and temperatures as low as 100° C.

Polyethylene copolymers suitable as the polyolefin resins of this invention include copolymers of ethylene with unsaturated esters of lower carboxylic acids as well as the carboxylic acids per se. In particular, copolymers of ethylene with vinylacetate or alkyl acrylates for example methyl acrylate and ethyl acrylate can be employed. These ethylene copolymers typically comprise about 60 to about 99 wt % ethylene, preferably about 70 to 95 wt % ethylene, more preferably about 75 to about 90 wt % ethylene. The expression "ethylene copolymer resin" as used in the specification and claims means, generally, copolymers of ethylene with unsaturated esters of lower ($C_1$–$C_4$) monocarboxylic acids and the acids themselves; e.g. acrylic acid, vinyl esters or alkyl acrylates. It is also meant to include both "EVA" and "EVOH", which refer to ethylene-vinylacetate copolymers, and their hydrolyzed counterpart ethylene-vinyl alcohols.

Illustrative of the acrylates which can be utilised are methyl acrylate and ethyl acrylate. Examples of such polyethylene copolymers include ethylene-acrylic acid, ethylenemethylacrylate, ethylene-methyl acrylate-acrylic acid, ethylene-methacrylic acid, etc. Similarly, those having acid groups only partially neutralized with metal cations to form those products known as ionomers will be suitable herein.

Particularly suitable in accordance with this invention are the ethylene-alpha-olefin elastomers (thermoplastic polyolefin rubbers) which are defined to include copolymers of ethylene and $C_3$–$C_{20}$ alpha-olefins, optionally with one or more non-conjugated diolefins. Such polymers are well-known as are their methods of preparation, see earlier identified U.S. Pat. No. 4,895,897, which is incorporated herein by reference.

Additionally, elastomeric butyl rubber and halogenated butyl rubber are suitable as the initial thermoplastic polymer and when containing, or modified to contain, functional groups reactive with direactive linking compounds or compositions permitting further reaction with SMA copolymer compounds. Butyl rubber and halogenated butyl rubber are well known articles of commerce and any such polymer product, suitably functionalised, will be effective in accordance with the invention. These polymers are based upon cationic polymerization of isobutylene, optionally with one or more monomers copolymerizable therewith, all as is well known.

Included for the purpose of this invention within the term elastomeric butyl rubber is the class of compositions making up polyisobutylene rubber, which strictly speaking is not butyl rubber, but is instead an elastomeric homopolymer of isobutylene. Polyisobutylene rubber is also a well known article of commerce manufactured in accordance with known methods.

Styrene-based polymers suitable as the thermoplastic polymer, and well known in the art include those which may be described as hydrogenated or partially hydrogenated homopolymers, and random, tapered, or block polymers (copolymers, including terpolymers, tetrapolymers, etc.) of conjugated dienes and/or monovinyl aromatic compounds with, optionally, alpha-olefins or lower alkenes, e.g. $C_3$ to $C_{18}$ alphaolefins or lower alkenes. The conjugated dienes including isoprene, butadiene, 2,3-dimethylbutadiene, piperylene and/or mixtures thereof, such as isoprene and butadiene. The monovinyl aromatic compounds include any of the following or mixtures thereof, vinyl di-orpolyaromatic compounds e.g., vinyl napthalene, but are preferably monovinyl monoaromatic compounds, such as styrene or alkylated styrenes substituted at the alpha-carbon atoms of the styrene, such as alphamethylstyrene, or at ring carbons, such as o-, m-, p- methylstyrene, ethylstyrene, propylstyrene, isopropylstyrene, butylstyrene, isobutylstyrene, tert-butylstyrene (e.g., p-tertbutylstyrene). Also included are vinylxylenes, methylethyl styrenes, and ethylvinylstyrenes. Alpha-olefins and lower alkenes optionally included in these random, tapered and block copolymers preferably include ethylene, propylene, butene, ethylene-propylene copolymers, isobutylene, and polymers and copolymers thereof. As is also known in the art, these random, tapered and block copolymers may include relatively small amounts, that is less than about 5 mole %, of other copolymerizable monomers such as vinyl pyridines, vinyl lactams, methacrylates, vinyl chloride, vinylidene chloride, vinyl acetate, vinyl stearate, and the like.

Specific examples include random polymers of butadiene and/or isoprene and polymers of isoprene and/or butadiene and styrene. Typical block copolymers include polystyrene-polyisoprene, polystyrene-polybutadiene, polystyrene-polyethylene, polystyrene-ethylene propylene copolymer, polyvinyl cyclohexane-hydrogenated polyisoprene, and polyvinyl cyclohexane-hydrogenated polybutadiene. Tapered polymers include those of the foregoing monomers prepared by methods known in the art.

(B) The Functionalized Thermoplastic Polymer

Functionalization of the above thermoplastic polymers to provide the functionalized thermoplastic polymers suitable for forming the graft polymer reaction product can be conveniently accomplished by incorporating functional moieties reactive either directly with the SMA copolymer or with linking compounds or compositions that contain groups reactive with both the functionalized thermoplastic polymer and the SMA copolymer. This incorporation of appropriate functional moieties can be accomplished by such well-known means as copolymerization of functional monomers into the thus functionalized thermoplastic polymer or by graft addition of functional moieties onto a thermoplastic polymer.

Functional moieties constituting in par the functionalized thermoplastic polymers of this invention include those capable of subsequent reaction with the dicarboxylic moiety in the SMA copolymer. Such functional moieties are typically nucleophilic groups as can be exemplified by hydroxyl, primary amino and secondary amino :

—OH, —$NH_2$ and —$NHR_1$ where $R_1$ is hydrocarboxyl of from 1 to 20 carbon atoms, preferably alkyl of from 1 to 5 carbon atoms, cycloalkyl of 3 to 7 carbon atoms, and the like.

Additional groups capable of direct reaction with SMA copolymer include carboxylate, thio, oxide, hydroxide and sulfonic acid groups. Any manner of incorporation of these functional groups will be effective for the purposes of this invention ; several are well-known in the art.

The content of functional groups incorporated in the thermoplastic polymer will be that sufficient to provide at least one site on each functionalized thermoplastic polymer chain which is reactive with the SMA copolymer or with a direactive linking compound. Typically the functional group will be present in an amount equal to at least 0.01 wt % of the functionalized thermoplastic polymer but generally not greater than about 15 wt % of the functionalized thermoplastic polymer. Preferably the functional group will be present in an amount between about 0.01 to 10 wt %, more preferably about 0.05 to 7 wt %, most preferably from about 0.2 to 2 wt %. However incorporated, the functional groups will preferably be present in an amount of from about 0.5 to about 30.0 milliequivalent per gram of thermoplastic polymer ("meq/100 g"), as measured by infrared analysis or by titration, and more preferably 1 to 20 meq/100 g, and most preferably 2 to 4 meq/100 g.

Functional moieties capable of reacting with linking compounds or compositions will typically include electrophilic groups selected for reactive capability with the selected linking compound or composition. Thus such groups will include those electrophilic groups reactive with polar group-containing linking compounds and are exemplified by such as carboxyl, esterified carboxyl, acid chloride, acid anhydride, aldehyde, ketone, silane, epoxy or halogen groups. The content of these electrophilic groups incorporated in the functionalized thermoplastic polymer will be equivalent to that addressed above for the nucleophilic groups. Again, it is sufficient that at least one reactive site be provided to allow attachment of the linking compound or composition that provides the reactive moiety for subsequent reaction with the SMA copolymer.

Both the electrophilic and nucleophilic groups are provided most preferably by ethylenically-unsaturated electrophilic or nucleophilic group-containing compounds which are either copolymerized during the preparation of the thermoplastic copolymers or are graft reacted onto a previously prepared polymer.

Copolymerization including the compound providing the electrophilic or nucleophilic groups will be possible when all the monomers of the polymers are polymerizable by either conventional free radical catalysis or Ziegler co-ordination catalysis. Copolymerizable monomers incorporated by free-radical catalysis include such comonomers as alkyl acrylates, vinyl esters, acrylic acids, methacrylic acid, and the like. Such thermoplastic polymers are known in the art as in their method of preparation. Illustrative of this knowledge is U.S. Pat. No. 4,017,557 which is incorporated by reference.

Thus copolymerizable monomers permitting the incorporation of these reactive electrophilic and nucleophilic groups into the thermoplastic polymers will be useful in accordance with this invention. Such compounds, methods of both preparation and incorporation with thermoplastic polymers are also well known. Descriptions for Ziegler copolymerization are to be found, inter alia, in U.S. Pat. Nos. 3,492,227, 3,761,458, 3,796,687, 4,017,669, 4,139,417, 4,423,196 and 4,987,200, the disclosures of which, including compounds and processes, are incorporated by reference. These patents teach the preparation of polyolefins particularly ethylene random terpolymers, tetrapolymers, etc. , from alpha-olefins, non-conjugated dienes and unsaturated functional monomers by direct Ziegler-Natta polymerization of the monomers, usually in solvent, utilizing catalyst systems composed of trivalent, and higher, vanadium compounds, organoaluminium compounds and, for some, halogenated reactivator compounds. These polymerization reactions are run in the absence of moisture in an inert atmosphere and in a preferred temperature range of 0° to 65° C. Both continuous and batch reactions are taught.

Included within the term copolymerization, for the purpose of this invention, are those chain terminating reactions wherein the appropriate functional groups are added to a forming thermoplastic polymer and simultaneously terminate the polymerization reaction. Such reactions are sometimes termed end-capping reaction and are generally known. In particular, the carbonation of polymers prepared by anionic polymerization through the introduction of gaseous $CO_2$ into the "living" polymerization reaction and termination of that reaction will be suitable for this invention. Description appears in the art, see for example the teachings of U.S. Pat. No. 4,950,721, which is incorporated herein by reference. End-capping of polyolefins prepared by Ziegler-Natta co-polymerization is known, in particular effective use of hydroxy compounds can be made in accordance with the disclosure contained in published European Patent Publication 0 366 412, based on U.S. application Ser. No. 264,484, which references disclosure contained in European Patent Publication 0 223 114 based on U.S. application Ser. No. 813,848, both of which are incorporated here by reference. By utilization of chain terminating functional group-containing compounds, the graft copolymers prepared by subsequent reactions with SMA, directly or indirectly through linking reactions, are end-grafted with the SMA copolymer.

The graft addition of ethylenically unsaturated electrophilic group containing compounds suitable in this invention, e.g. maleic anhydride, is conveniently accomplished by heating a blend of the thermoplastic polymer and the unsaturated electrophilic group-containing compounds within a range of about 150°–400° C., often in presence of free-radical initiators such as organic peroxides. Methods of preparing these graft polymers are well known in the art as is illustrated in U.S. Pat. Nos. 4,017,557 (above), 3,962,265, 3,884,882, 4,160,739, 4,161,452, 4,144,181, 4,506,056 and 4,749,505, the disclosures of which are incorporated herein by reference. The use of heat and/or physical shearing, optionally with the free-radical initiators, in such equipment as extruders or masticators to accomplish the free-radical grafting of ethylenically-unsaturated carboxyl group-containing compounds, all as known in the art, will be particularly useful in accordance with this invention.

The graft addition to polyolefins of carboxylic acid group containing monomers, and epoxy group-containing monomers, is also known. Description appears in, inter alia, U.S. Pat. Nos. 3,862,265, 4,026,967, 4,068,057, 4,388,202 and 4,749,505, the disclosures of which are incorporated by reference. As is noted, these grafting methods parallel those useful for the grafting of maleic anhydride described more fully above. Epoxy group-containing compounds effective in such grafting reactions are represented by such as glycidyl acrylate, glycidyl methacrylate, and the like. One or more electrophilic groups useful in accordance with this invention are thus readily incorporated in the functionalised polymers of this invention by use of knowledge in the art.

Though the description herein with respect to the incorporation of electrophilic and nucleophilic groups are directed to conventional copolymerization and grafting methods, it will be apparent to those in the art that any additional methods for such incorporation will be effective to achieve the objectives of this invention. For example, the preparation of epoxy group-containing polymeric compounds by the direct epoxidation of polymers containing either backbone or pendent unsaturation is known in the art. U.S. Pat. Nos. 3,330,794, 3,448,174 and 3,551,518 describe the use of epoxidising agents, such as perbenzoic acid, to directly oxidise unsaturation in ethylene-containing elastomeric compounds to attain incorporated epoxy, or oxirane, groupings. These disclosures are incorporated by reference. Similarly, direct halogenation of thermoplastics such as butyl rubber to form halobutyl rubber, is well known in the art.

In a preferred embodiment the graft polymer reaction product comprises one or more nitrogen-containing chains linking said thermoplastic polymer with said styrene maleic anhydride copolymer. Such chains may be derived from an amino compound having one primary amino group and one secondary amino group.

In this case a graft polymer will commonly be produced by reacting an initial thermoplastic polymer, carrying functional groups reactive with amines, and an amino compound having one primary amino group and one secondary amino group whereby the primary amino group reacts preferentially with said functional groups. Selective reaction of the primary amino group to leave the secondary amino group unreacted may be determined by thermodynamic criteria, notably by the $pK_b$ values of the primary and secondary amino groups but also by reaction kinetics, which may be influenced by steric hindrance of the secondary amine and the solubility of the amino compound in the polyolefin. In general, the $pK_b$ of the secondary amino group should be less than 7 to provide adequate reactivity but should be 3.0 or greater. The aminothermoplastic polymer product will then be reacted with SMA to form the compatibilizer.

Such an amino compound may be a diamine, i.e. with only the two amino groupings specified above, or may contain further substantially unreactive amino groups, for example, in intermediate positions between the reactive primary and secondary amino groups. The amino compounds may thus be represented by the formula $NH_2$—R—$NHR^1$ where R is an organic group and $R^1$ is a further organic group which may optionally be joined to the group R to form a nitrogen-containing heterocyclic ring.

The group R may thus, for example, be a divalent alkylene group having 1 to 12 carbon atoms, preferably 1-6 carbon atoms, e.g. ethylene or propylene, or a divalent aryl group having 6-12 carbon atoms, such as phenylene e.g. 2-phenylene or 4-phenylene. When R and $R^1$ with the intervening nitrogen form a ring, this may contain 5-7 carbon atoms and/or nitrogen, e.g. a piperidine or piperazine ring.

The group $R^1$ may be an aliphatic group, e.g. an alkyl group having 1-6 carbon atoms, which may be substituted with one or more hydroxyl groups e.g. 2-hydroxyethyl ; an aralkyl group with 6-12 carbon atoms, e.g. benzyl ; or an aryl group with 6 to 12 carbon atoms e.g. phenyl. Typical diamines for use in accordance with the invention include the following :
N-methylethyldiamine
N-ethylethyldiamine
N-phenylethyldiamine
N-methyl-1,3-propyldiamine
N-phenyl-1,2-phenyldiamine
N-phenyl-1,4-phenyldiamine
1-(2-aminoethyl)piperazine
N-(2-aminoethyl)aminoethanol Anhydride groups are particularly useful in that they react with primary amino groups to form stable cyclic imido groupings while forming less stable amide groups with secondary amines. The latter amide groups can be displaced by a more thermodynamically preferred reaction with primary amino groups thus promoting selective binding of principally the primary amino groups.

As an alternative to using a diamino compound, the reaction product may be obtained by using any direactive linking compound or composition. Typically the functionalized thermoplastic will be one with incorporated electrophilic functionality, as described above, and the direactive compound will contain dual nucleophilic functionality reactive with both the functionalized thermoplastic polymer and the electrophilic maleic functionality of the SMA copolymer. Suitable nucleophilic groups for the linking compound include the primary and secondary amines, hydroxyl, thio, carboxylate, oxide, hydroxides, and such strong acid groups as sulfonic acid. Specific examples include divalent metal acetates or oxides, preferably those of Zn, Mn and Ca.

These linking compounds or compositions can be reacted with either of the functionalized thermoplastic polymer or the SMA copolymer prior to the polymeric graft reaction, but most often will be added directly to a blend of the functionalized thermoplastic polymer with the SMA copolymer during melt processing to minimize cross-link formation between members of the same class, whether the functionalized thermoplastic polymer or the SMA copolymer.

In another preferred embodiment, copolymerization of polar functionality directly into the thermoplastic polymer can provide either of nucleophilic groups, such as the hydroxyl, primary or secondary amine, or the electrophilic groups such as dicarboxylic acid/anhydride. The nucleophilic groups, as indicated, will react directly with the maleic groups on the SMA and the electrophilic groups are available for subsequent linking reactions with the direactive nucleophilic compounds. See particularly the disclosures of U.S. Pat. No. 4,987,200 for effective means of preparing functionalized polyolefin thermoplastic polymers.

(C) The SMA Copolymer

As indicated the graft polymer of the invention is the reaction product of the functionalized thermoplastic polymer with SMA copolymer. This copolymer is based on styrene and/or alpha-methylstyrene and maleic anhydride, and may consist of :
(i) about 50 to about 99.9 wt % styrene and/or alpha-methylstyrene ;
(ii) about 50 to about 0.1 wt % maleic anhydride ;
(iii) about 0 to about 20 wt % acrylate or methacrymlate, and
(iv) about 0 to about 20 wt % acrylonitrile.

The copolymers used in the invention advantageously have a weight-average molecular weight greater than about 1,000, preferably between 15,000 and 200,000. The weight average molecular weight (Mw) can be determined in accordance with a method described in Journal of Applied Polymer Science, Vol. 20, 1619-1626 (1976), the disclosure of which is hereby incorporated by reference. See also the disclosure of U.S. Pat. No. 4,742,116, incorporated herein by reference.

The SMA copolymer should have sufficient molecular weight configuration and solubility characteristics to be at least partially compatible with the engineering thermoplastics to be modified or compatibilized. Solubility and compatibility are determined empirically through preparing blends and observing for phase separation, morphology, etc. Procedures for such are well known.

The copolymers of styrene and/or alpha-methylstyrene and maleic anhydride are known and are generally described in available literature. The copolymers are prepared prior to graft reacting with the functionalized thermoplastic polymers, according to customary processes such as mass polymerization or polymerization in solution. These copolymers of styrene and maleic anhydride can, for instance, be obtained by reacting the two monomers, styrene and maleic anhydride, with each other in the presence of benzoyl peroxide. The polymerization rate can be controlled much better when a solvent is used. Suitable exemplary solvents include, for instance, acetone, toluene, xylene, dioxane or methyl ethyl ketone.

A 50:50 (molar)-copolymer can be obtained by discontinuous copolymerization of styrene and maleic anhydride, for instance by precipitation polymerization of styrene and maleic anhydride in aromatic solvents. Copolymers having less maleic anhydride can be obtained in a continuous copolymerization process if an amount of a mixture composed of excess styrene to maleic anhydride is fed at high temperatures into a polymerization vessel with vigorous stirring while simultaneously removing a little quantity of polymerization mixture from the vessel. The disclosures of A.W. Hanson and R.L. Zimmerman, Industrial Engineering Chemistry 49, page 1803, 957 and in the Encyclopedia of Polymer Science and Engineering, vol. 13, pages 262–264, described additional processes and process details.

For a terpolymer, the styrene-maleic anhydride copolymer may contain 0–20 wt % acrylonitrile or an acrylate such as, for instance, methyl methacrylate or ethyl acrylate, as in Hanson.

(D) The Engineering Thermoplastic

The functionalized thermoplastic polymer-SMA reaction product is particularly effective when used in the compatibilization or toughening of engineering thermoplastics ("ETP"). Many engineering thermoplastics are at least partially compatible with SMA and the graft polymer thus assists modification of those engineering thermoplastics. The SMA will have at least partial compatibilities with both polar thermoplastics and those based on styrene.

Thus the engineering thermoplastic to be modified in accordance with this invention will include : aliphatic and aromatic polycarbonates (such as bisphenol A polycarbonate), polyesters (such as poly(butylene terephthalate) and poly(ethylene terephthalate)), polyamides, styrene polymers (including related block, graft and random copolymers such as acrylonitrile-butadiene-styrene-copolymers, butadiene-styrene copolymers, styrene-acrilonitrile copolymers), polyacetal, polyphenylene ether and mixtures with styrene polymers, acrylic and methacrylic ester polymers (as polymethyl methacrylate), vinyl chloride/vinylidene chloride/vinyl fluoride/vinylidene fluoride polymers, or mixtures thereof.

Each of the above engineering thermoplastics are commercially available and prepared in accordance with known processes. For additional details, reference can be made to such technical publications as Encyclopedia of Polymer Science and Engineering, John Wiley and Sons., 1988, under the respective engineering thermoplastic polymer topic heading. Specific detail on selected polar engineering thermoplastics follow.

Polycarbonate resins are well known thermoplastics polymers and are described, for example, in Encyclopedia of Polymer Science and Technology, Vol. 10, page 710 to 727, 1969, Interscience, New York. The polycarbonate resins may be produced by known methods such as, for example, by reaction of phosgene and a polyhydric phenol, such as bisphenol A (4,4'-dihydroxyphenyl-2, 2'-propane) or by ester exchange between a polyhydric phenol and diphenyl carbonate.

A preferred polyhydric phenol is a dihydric phenol such as bisphenol A. Polycarbonate resins are commercially available. Suitable polycarbonate resins for the practice of the present invention may be any polycarbonate resins. The weight average molecular weight of suitable polycarbonate resins may range from about 30,000 to about 500,000, preferably from about 40,000 to about 400,000.

Suitable styrene-acrylonitrile copolymers may contain from about 5 to about 85 mole percent of styrene and from about 10 to about 50 mole percent of acrylonitrile. Suitable styrene acrylonitrile copolymer may have a weight average molecular weight, as determined by gel penetration chromatography, ranging from about 40,000 to about 300,000.

Suitable thermoplastic polyamides (nylon) comprise crystalline or resinous, high molecular weight solid polymers including copolymers and terpolymers having recurring amide units within the polymer chain. Polyamides may be prepared by polymerization of one or more epsilon-lactams such as caprolactam, pyrrolidione, lauryllactam and aminoundecanoic lactam, or amino acid, or by condensation of dibasic acids and diamines. Both fiber-forming and moulding grade nylons are suitable. Examples of such polyamides are polycaprolactam (nylon-6), polyauryllactam (nylon 12), polyhexamethyleneadipamide (nylon- 6,6), polyhexamethyleneazelamide (nylon-6,9), polyhexamethylenesebacamide (nylon-6, 10), polyhexamethyleneisophthalamide (nylon-6, IP), polyhexamethyleneterephthalamide (nylon-6, TP) and the condensation product of 11-aminoundecanoic acid (nylon-11). Additional examples of satisfactory polyamides (especially those having a softening point below 275° C.) are described in Kirk-Othmer, Encyclopedia of Polymer Science and Technology, Vol. 10, pages 392–414. Commercially available thermoplastic polyamides may be advantageously used in the practice of this invention, with linear crystalline polyamides having a softening point or melting point between 160°–230° C. being preferred.

Suitable thermoplastic polyesters comprise crystalline high molecular weight solid polymers having recurring

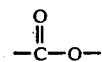

groups within the polymer chain. The recurring ester groups are within the polymer backbone and not pendant therefrom. The melting point of the crystalline polyester is generally above 50° C., more preferably above 100° C., more preferably from about 160° to 260° C. The thermoplastic polyester may be, for example, polyethylene terephthalate for use in the present invention include those having intrinsic viscosity of at least 0.2 decilitre per gram, preferably at least about 0.4 to 1.4 deciliter per gram, as measured in a 60:40 phenol: tetrachloroethane mixture at 30° C. It is commercially available and may be prepared by known methods such as those disclosed in U.S. Pat. No. 2,465,319 and U.S. Pat. No. 3,047,539, the teachings of which are hereby incorporated by reference.

The weight average molecular weight of the polyethylene and polybutylene terephthalate suitable for the practice of the present invention may range from about 15,000 to about 100,000.

(E) Preparation of the Graft Polymer

The graft polymer of the invention is prepared by melt reacting the functionalized thermoplastic polymer with the styrene maleic anhydride copolymer, preferably in intimate contact with either, or both, of the engineering thermoplastic and unfunctionalized thermoplastic, or portions thereof.

The reaction is accomplished by achieving contact through intensive mixing of the polymeric reactants under melt processing conditions. Typically the contacting can be accomplished by premixing preformed pellets of the functionalized thermoplastic polymer with those of the SMA copolymer, and in those cases requiring use of linking compounds or compositions, with the addition of the linking composition, in any physical blender or mixer, such as an extruder, Banbury, Brabender, etc., at temperatures above the melting temperature of the highest-temperature melting component. Temperatures between about 150° C. to about 300° C. will typically be appropriate. As low a temperature as necessary for effective mixing in the melt phase will be preferable.

The SMA copolymer is prepared or selected having molecular weight, comonomer content and distribution, molecular weight distribution appropriate to the blend composition to be modified. That is, it is selected or prepared so that its miscibility or compatibility characteristics in blends with the engineering thermoplastic are at acceptable levels in accordance with the end-use contemplated. By this method, it is possible to control the ratio of SMA to thermoplastic polymer in the compatibilizer, to control the SMA composition (styrene and Ma content molecular weight, etc.) and thereby tailor the compatibilizer to the particular target engineering thermoplastic or thermoplastic blend.

Optimization will be possible in accordance with routine bench testing of the various SMA copolymers, or mixtures, with the various functionalized thermoplastics in ETP compositions.

When a diamine linking composition is utilized, the reaction of the functionalised initial polymer with the amino compound may also be effected by melt reaction. The reaction temperature will commonly be in the range 150° to 300° C., e.g. about 185° C. Such a reaction may readily be accomplished in a mixing device such as a Brabender or Banbury mixer or an extruder e.g. a single or double screw extruder. The reaction time may be a few seconds (e.g. 30 seconds) to a few minutes, typically one minute in an extruder and 3 minutes in a Brabander mixer. The amine should be present in excess. Amine functionality may be assayed by solvent titration and residual groups such as anhydride may be assayed by I.R.

The amine functionalised polymer is then reacted with the SMA by melt reaction, for example in a Brabander mixer or an extruder. The reaction time and temperature will depend on the thermoplastics present. This reaction may be carried out in a separate step or preferably, may be effected in situ in a melt of the polymer or polymers to be compatibilized. Use of the separate step as a means of forming the reaction product of functionalized thermoplastic and the SMA is less preferred typically because of the incompatibility of the two polymer components. Though the graft reaction product can be obtained, significant portions of unreacted SMA and functionalized thermoplastic will need additional separation steps if intensive and long mixing procedures are not utilized. However, retention of the unreacted components, particularly if kept to lesser significant levels by means of the melt processing utilized, may be of benefit with certain ETP blends. For example, unreacted amino-functionalized thermoplastics will tend to react with certain polar ETP's and unreacted SMA will be compatible with these same ETP's.

In particular, the preferred process is illustrated by the following. Amino-functionalised polypropylene (amino-PP) may be melt reacted with a blend of SMA polymer in polypropylene containing one or more of the engineering thermoplastics to provide effective compatibilization of the polypropylene and engineering thermoplastic, as demonstrated by reduced particle size of the dispersed engineering thermoplastic.

(F) Engineering Thermoplastic Blend Composition

Generally a minimum of about 2 wt % of the graft polymer of the invention will be sufficient to observe compatibilization effects on the engineering thermoplastic blend compositions in which used. Such amounts of the graft polymer can be used in such amounts above the minimum as will positively affect the blend characteristics without substantially degrading other sought characteristics. Thus typical blends will comprise the following : (a) engineering thermoplastic, 95-5 wt % (b) thermoplastic polymer, 0-95 wt % ; and (c) graft polymer, 2-50 wt %. Preferred engineering thermoplastic blends of the invention, e.g., modified for improved impact strength, will typically comprise from 50-95 wt % engineering thermoplastic 0-40 % modifying thermoplastic polymer and 2-50 wt % graft copolymer. Preferred compatibilized blends also include those where the thermoplastic polymer is to be modified by the engineering thermoplastic, e.g., engineering thermoplastic 5-50 wt %, thermoplastic polymer 50-95 wt %, and graft copolymer 2-25 wt %.

Generally, the blend compositions of the invention can be prepared by mixing the engineering thermoplastic, functionalized thermoplastic and SMA copolymer, optionally with unfunctionalized thermoplastic, in any order and subjecting the mixture to temperatures sufficient to melt the mixture, for example, 175° C. and up. Such mixing and heating can be accomplished using conventional hot processing equipment known in the art, such as a Brabender, Banbury Mixer, a roll mill, a single or multiple screw extruder, etc., employing known thermoplastic processing techniques. Optionally, a masterbatch blending technique is employed wherein the functionalized thermoplastic and the SMA copolymer are mixed, optionally with small amounts of either or both of the engineering thermoplastic and unfunctionalized thermoplastic, i.e. about 0 to 50 wt % of the total master batch blend, and melt processed as previously described. The thus formed graft copolymer of functionalized thermoplastic and SMA copolymer, optionally in concentrated form in an engineering thermoplastic and/or thermoplastic blend, can then pelletized for ease of handling. This masterbatch blend is then available for subsequent mixture with engineering thermoplastic, and optionally additional unfunctionalized thermoplastic, at an elevated blending temperature and in desired ratios to produce the engineering thermoplastic blend compositions of the invention.

The final compatibilized compositions, as with other thermoplastic blends known in the art, can contain stabilizers, anti-oxidants, fillers, processing aids, pigments and other additives in normal and conventional amounts, dependent upon the desired end-use. If used, the conventional additives are mechanically blended and the compositions of the invention are then molded in known methods.

The blend compositions of the invention are useful as shaped articles, molded articles and the like.

The following examples are given by way of illustration only:

EXAMPLES

The following conditions were observed in preparing the examples presented which are intended to illustrate the invention and to present the preferred embodiments as currently known.

| Injection Moulding Conditions | | |
|---|---|---|
| Apparatus: | Boy (Family Mould) | |
| Conditions: | Temperature of barrel: | 250° C. |
| | Mould T°: | 60° C. |
| | Holding Pressure: | 30–40 bar/20 sec. |
| | Cooling time: | 15 sec. |
| Mechanical Properties | | |
| Flexural Modulus: ASTM D 790-86 | | |
| Crosshead speed: | | 1.71 mm/min. |
| Span: | | 64 mm |
| Sample dimensions: | | |
| depth: | | 4 mm |
| width: | | 10 mm |
| length: | | 80 mm |
| Tensile Strength: ASTM D638-89 | | |
| Crosshead speed: | | 20 mm/min. |
| Sample dimensions: | | |
| width: | | 10 mm |
| thickness: | | 3.2 mm |
| Notched Izod Impact Strength: ASTM D256-88 | | |
| Samples dimensions: | | |
| width: | | 3.2 mm |
| thickness: | | 13 mm |
| length: | | 63 mm |

All properties tested at 21° C., 50% humidity, dry as moulded. Materials used in the examples:

| | |
|---|---|
| MAPP: | Maleic Anhydride - grafted - Polypropylene |
| | Trade Name: Exxelor PO 1015 from |
| | Exxon Chemical Co. |
| | MFR: 88 g./10 min (at 230° C., 2.16 kg) |
| | Anhydride content: 4 mmole/100 g |
| MAEP1: | Maleic Anhydride - grafted - Ethylene -Polypropylene Rubber |
| | Trade Name: Exxelor VA 1820 from |
| | Exxon Chemical Co. |
| | MFR: 2.5 g./10 min (at 230° C., 2.16 kg) |
| | Anhydride content: 3.5 mmole/100 g |
| | Ethylene content in EPR: 77% |
| MAEP2: | Maleic Anhydride - grafted - Ethylene -Polypropylene Rubber |
| | Trade Name: Exxelor VA 1803 from |
| | Exxon Chemical Co. |
| | MFR: 3 g./10 min (at 230° C., 2.16 kg) |
| | Anhydride content: 7 mmole/100 g |
| | Ethylene content in EPR: 50% |
| AMP: | 3-Amino-1-Methylamino-n-Propane from Aldrich Chemicals |
| | Case No. 6291-84-5 |
| | Purity: 98% |
| SMA1: | Styrene-Maleic Anhydride Copolymer |
| | Trade Name: Dylark 232 from Arco Chemical |
| | Maleic Anhydride content: 8 wt % |
| | Mw: approx. 80,000 g./mole |
| SMA2: | Styrene-Maleic Anhydride Copolymer |
| | Trade Name: Dylark 332 from Arco Chemical |
| | Maleic Anhydride: 14 wt % |
| | Mw: approx. 80,000 g./mole |
| SMA3: | Styrene-Maleic Anhydride Copolymer |
| | Trade Name: 17.925.77 from Janssen Chimica |
| | Styrene content: approx. 50% |
| | Mw: approx. 50,000 g./mole |
| SMA4: | Styrene-Maleic Anhydride Copolymer |
| | Trade Name: 19.091.79 from Janssen Chimica |
| | Styrene content: approx. 75% |
| | Mw: approx. 1,900 g./mole |
| SAN: | Styrene-Acrylonitrile Copolymer |
| | Trade Name: Luran 368R from BASF |
| | MFR: 11 g./10 min. (200° C., 21.6 kg) |
| | Styrene content: approx. 75% |
| PMMA: | Polymethylmethacrylate |
| | Trade Name: 18,224-9 from Aldrich Chemical |
| | Medium Mw |
| PBT1: | Polybutylene Terephthalate |
| | Trade Name: Pocan 1305 from Bayer |
| | MFR: 30 g./10 min (250° C., 2.16 kg) |
| PBT2: | Polybutylene Terephthalate |
| | Trade Name: Pocan 1505 from Bayer |
| | MFR: 12 g./10 min (250° C., 2.16 kg) |
| POM: | Polyoxymethylene |
| | Trade Name: Ultraform H2320 from BASF |
| | MFR: 2.5 g./10 min (190° C., 2.16 kg) |
| PP1: | Polypropylene |
| | Trade Name: VB40 from Neste |
| | MFR: 4 g./10 min (230° C., 2.16 kg) |
| PP2: | Polypropylene |
| | Trade Name: VC12 from Neste |
| | MFR: 10 g./10 min (230° C., 2.16 kg) |
| PP3: | Polypropylene |
| | Trade Name: VA80 from Neste |
| | MFR: 0.8 g./10 min (230° C., 2.16 kg) |
| EP: | Ethylene-Propylene Rubber |
| | Trade Name: Vistalon 805 from Exxon Chemical |
| | MFR: 3 g./10 min (230° C., 2.16 kg) |
| | Ethylene content: 77% |
| ABS: | Acrylonitrile-Butadiene-Styrene Copolymer |
| | Trade Name: Ronfolin FG50 from DSM |
| PC: | Polycarbonate of Bisphenol A |
| | Trade Name: Lexan 121-111 from General Electric |
| | MFR of 16.5 (ASTM D1238) |
| PS: | Polystyrene |
| | Trade Name: Styron L63526 from Dow Chemical |
| | MFR of 15 (ASTM D1238) |
| PPE: | Poly(phenylene ether) |
| | Trade Name: Luranyl KR2402 from Bayer |

EXAMPLE 1

Production of Amino-PP, ref: amPP1, in extruder

| | |
|---|---|
| Extrusion conditions: | |
| Welding Engineer Twin Screw Extruder | |
| Temperature: | 174 to 222° C. |
| Screw speed: | 250 RPM |
| $N_2$ stripping: | 0.7 kg/h |
| Vacuum on vent barrel: | 700 mbar |
| Feeding conditions: | |
| MAPP: | 7 kg/h |
| AMP: | 1.25 ml/min |
| amPP1 analysis: | |
| MFR: | 76 g./10 min |
| | (230° C., 2.16 kg) |
| Amine Content: | 3.2 mmole/100 g |
| (by HCL Titration): | |

In this Example 1, an aminated polypropylene was prepared by neutralization of maleated polypropylene with an amino compound in accordance with the invention in a melt processing reaction. There was negligible increase in melt flow rate between the initial maleated polypropylene and the final aminated polypropylene. The final amine content showed almost equivalent reaction of amine groups with available anhydride sites. There was essentially no cross-linking or chain extension.

EXAMPLE 2

Production of Amino-PP, ref: amPP2, in Brabender mixer

| Mixing conditions: | Brabender mixer |
|---|---|
| Temperature: | 180° C. |
| Screw speed: | 60 RPM |
| Feeding conditions: | |
| 50 g MAPP mixed for 3 min. | |
| 0.29 g AMP added to the melt | |
| Sample was recovered after 6 additional min. of mixing | |
| amPP2 analysis: | |
| No residual anhydride (by IR) | |
| Amine Content (by HCL Titration): | 2.9 mmole/100 g |

In this Example 2, the reaction of Example 1 was repeated in a Brabender mixer. No significant cross-linking or chain extension was observed. By Infrared analysis it was shown that no anhydride functionality remained unreacted.

EXAMPLE 3

Production of Amino-EP, ref: amEP1 in extruder

| Extrusion conditions: | as Example 1 |
|---|---|
| Feeding conditions: | |
| MAEP1: | 7 kg/h |
| AMP: | 0.823 ml/min |
| amEP1 analysis: | |
| MFR: | 1.5 g./10 min (230° C., 2.16 kg) |
| Amine content (by HCL Titration): | 2 mmole/100 g |

In this Example 3, an aminated ethylene-propylene copolymer was prepared utilizing a commercially available maleated ethylene-propylene rubber under melt processing conditions utilizing a twin screw extruder as in Example 1. Negligible decrease in MFR was observed while a substantial portion of anhydride sites were neutralized.

EXAMPLE 4

Production of Amino-EP, ref: amEP2 in extruder

| Extrusion conditions: | as Example 1 |
|---|---|
| Feeding conditions: | |
| MAEP2: | 7 kg/h |
| AMP: | 1.92 ml/min |
| amEP2 analysis: | |
| MFR: | 2.4 g./10 min (230° C., 2.16 kg) |
| Amine content (by HCL Titration): | 4 mmole/100 g |

In this Example 3, the preparation, as in Example 3, was repeated using a different commercially available maleated ethylene-propylene rubber. Similar results were obtained.

EXAMPLE 5

Compatibilization by amino PP/SMA of PP/ETP blends

All blends were prepared on a Brabender mixer at 60 RPM and at a temperature of 240° C. An additive is considered to be a compatibilizer if it is able to reduce the particle size of a dispersed polymer in a PP matrix. The smaller the ratio of the particle size after compatibilization to the size before compatibilization, the higher is the compatibilizer's efficiency. Thus the blends were analyzed by Scanning Electron Microscopy (SEM) to determine the particle size of the dispersed phase.

| PP1 wt % | SMA4 wt % | ETP type | ETP wt % | AmPP2 wt % | Size (microns) |
|---|---|---|---|---|---|
| 80 | 0 | ABS | 20 | 0 | 10 |
| 75 | 5 | ABS | 20 | 5 | 1 |
| 80 | 0 | PC | 20 | 0 | 2.5 |
| 75 | 5 | PC | 20 | 5 | 0.5 |
| 80 | 0 | PBT | 20 | 0 | 6 |
| 77 | 3 | PBT | 20 | 3 | 1.2 |
| 80 | 0 | PMMA | 20 | 0 | 10 |
| 77 | 3 | PMMA | 20 | 3 | 1 |
| 80 | 0 | PS | 20 | .0 | 3 |
| 77 | 3 | PS | 20 | 3 | 1 |

ETP = Engineering Thermoplastic

This example shows that the invention polypropylene graft-SMA polymer is an excellent compatibilizer for a wide range of PP/ETP blends. In this Example 5, the compatibilizer was produced in situ by reaction of a SMA copolymer and a functionalized PP as prepared in Example 2.

EXAMPLE 6

Compatibilization of amino EP/SMA in ETP/EP blends

All blends prepared on a Brabender mixer at 60 RPM and at a temperature of 240° C.

Refer to Example 5 for details. Example 6 is similar to Example 5 but uses EP-SMA instead of PP-SMA.

| ETP Type | ETP wt % | amEP2 wt % | EP wt % | SMA2 wt % | Size (microns) |
|---|---|---|---|---|---|
| SAN | 80 | 0 | 20 | 0 | 10 |
| SAN | 77 | 3 | 17 | 3 | 2 |
| PMMA | 80 | 0 | 20 | 0 | 8 |
| PMMA | 75 | 20 | 0 | 5 | 3 |
| PBT | 80 | 0 | 20 | 0 | 8 |
| PBT | 75 | 20 | 0- | 5 | 4 |
| POM | 80 | 0 | 20 | 0 | 11 |
| POM | 75 | 20 | 0 | 5 | 4 |

EXAMPLE 7

This Example shows that by selecting specifically the SMA grade (composition), and by choosing the ratio between SMA and the functionalized polyolefin weight, it was possible to obtain particular blend morphologies.

| ETP type | EP pbw | PP1 pbw | PP3 pbw | SMA1 pbw | SMA2 pbw | SMA3 pbw | amPP2 pbw | amEP2 pbw | Size (microns) |
|---|---|---|---|---|---|---|---|---|---|
| SAN | 20 | 0 | 80 | 0 | 0 | 0 | 0 | 3 | 0 | 8 |
| SAN | 20 | 0 | 80 | 0 | 0 | 1 | 0 | 3 | 0 | 4 |
| SAN | 20 | 0 | 80 | 0 | 0 | 2 | 0 | 3 | 0 | 2 |
| SAN | 20 | 0 | 80 | 0 | 0 | 3 | 0 | 3 | 0 | 1.5 |
| SAN | 20 | 0 | 0 | 80 | 0 | 0 | 0 | 0 | 0 | 10 |
| SAN | 20 | 0 | 0 | 80 | 0 | 3 | 0 | 3 | 0 | 1 |
| SAN | 20 | 0 | 0 | 80 | 0 | 5 | 0 | 5 | 0 | 2 |
| ABS | 20 | 0 | 80 | 0 | 3 | 0 | 0 | 3 | 0 | 4 |
| ABS | 20 | 0 | 80 | 0 | 0 | 3 | 0 | 3 | 0 | 2 |
| SAN | 100 | 0 | 0 | 0 | 0 | 0 | 0 | 0 | 20 | 6 |
| SAN | 100 | 0 | 0 | 0 | 0 | 5 | 0 | 0 | 20 | 3 |
| SAN | 100 | 0 | 0 | 0 | 0 | 10 | 0 | 0 | 20 | 1.2 |
| SAN | 100 | 0 | 0 | 0 | 0 | 15 | 0 | 0 | 20 | 1 |
| SAN | 100 | 5 | 0 | 0 | 0 | 10 | 0 | 0 | 0 | 4 |
| SAN | 100 | 5 | 0 | 0 | 0 | 10 | 0 | 0 | 10 | 0.6 |
| SAN | 100 | 5 | 0 | 0 | 0 | 10 | 0 | 0 | 20 | 1 |
| PPE | 100 | 0 | 0 | 0 | 0 | 0 | 0 | 0 | 10 | 2 |
| PPE | 100 | 0 | 0 | 0 | 2 | 0 | 0 | 0 | 10 | 1.5 |
| PPE | 100 | 0 | 0 | 0 | 5 | 0 | 0 | 0 | 10 | 1 |
| PPE | 100 | 0 | 0 | 0 | 10 | 0 | 0 | 0 | 10 | 0.7 |
| PBT | 80 | 0 | 0 | 0 | 0 | 10 | 0 | 0 | 10 | 3 |
| PBT | 80 | 0 | 0 | 0 | 0 | 5 | 5 | 0 | 10 | 0.8 |
| PBT | 80 | 0 | 0 | 0 | 0 | 0 | 10 | 0 | 10 | 4 |

Note:
Size is diameter of dispersed phase (either rubber phase in ETP/EP blends, or ETP in PP/ETP blends).

Note especially ABS and PBT series, where everything is kept constant except for the SMA composition. Large differences were observed in the resulting morphology.

In Example 7, it is shown that by selecting the SMA copolymers composition and content in the Polyolefin-SMA graft polymer, its compatibilization efficiency can be controlled. In this Example 7, the polyolefin-SMA is produced in situ by melt reaction of a suitable SMA copolymer, or a mixture of SMA copolymers with an aminated polyolefin in the presence of the engineering thermoplastic.

EXAMPLE 8

This Example shows mechanical properties of ETP/-SMA/amino—PO/PO blends ("PO" meaning polyolefin thermoplastic).

Compositions 0 to 13 were prepared on a Leistritz Twin Screw Extruder. All components were dry-blended, feed rate : 15 kg/h, screw speed : 150 RPM, temperature : 200°-260° C.

Blends 14-16 were prepared on a Brabender Single Screw Extruder. All components were dry-blended, feed rate : 3 kg/h, screw speed : 110 RPM, temperature : 240° C.

All blends injection-moulded on a Boy Injection Moulding machine under conditions recommended by ETP producers. Injection moulded samples were tested under ASTM standards.

Composition 17 was prepared in the Brabender Single Screw Extruder as with Examples 14-16, but was melt processed through the extruder twice to increase residence time and improve mixing. Significant improvement in impact strength was observed.

| ETP type | wt % | PP3 pbw | PP2 pbw | EP pbw | amPP1 pbw | amEP1 pbw | amEP2 pbw | SMA1 pbw | SMA2 pbw | Dy nPA | Ef GPA | Iz kJ/m² | Ref. |
|---|---|---|---|---|---|---|---|---|---|---|---|---|---|
| — | 0 | 100 | 0 | 0 | 0 | 0 | 0 | 0 | 0 | 31 | 1.1 | 5.6 | 0 |
| — | 0 | 0 | 100 | 0 | 0 | 0 | 0 | 0 | 0 | 33 | 1.3 | 3.1 | 1 |
| SAN | 100 | 0 | 0 | 0 | 0 | 0 | 0 | 0 | 0 | 72 | 3.3 | 3 | 2 |
| SAN | 30 | 70 | 0 | 0 | 7.5 | 0 | 0 | 0 | 7.5 | 42 | 1.8 | 11.3 | 3 |
| SAN | 40 | 60 | 0 | 0 | 10 | 0 | 0 | 0 | 10 | 45 | 1.9 | 8.9 | 4 |
| SAN | 50 | 50 | 0 | 0 | 10 | 0 | 0 | 0 | 10 | 48 | 2.1 | 8.8 | 5 |
| SAN | 60 | 40 | 0 | 0 | 10 | 0 | 0 | 0 | 10 | 52 | 2.3 | 7.3 | 6 |
| SAN | 70 | 30 | 0 | 0 | 7.5 | 0 | 0 | 0 | 7.5 | 51 | 2.3 | 3.7 | 7 |
| SAN | 30 | 0 | 70 | 0 | 7.5 | 0 | 0 | 0 | 7.5 | 35 | 1.8 | 7.2 | 8 |
| SAN | 40 | 0 | 60 | 0 | 10 | 0 | 0 | 0 | 10 | 35 | 2 | 9.3 | 9 |
| SAN | 50 | 0 | 50 | 0 | 10 | 0 | 0 | 0 | 10 | 38 | 2.1 | 5.6 | 10 |
| SAN | 60 | 0 | 40 | 0 | 10 | 0 | 0 | 0 | 10 | 45 | 2.3 | 10.2 | 10a |
| SAN | 70 | 0 | 30 | 0 | 7.5 | 0 | 0 | 0 | 7.5 | 49 | 2.5 | 4.5 | 10b |
| SAN | 80 | 0 | 0 | 0 | 0 | 0 | 20 | 0 | 20 | 52 | 2.3 | 25 | 11 |
| SAN | 80 | 0 | 0 | 0 | 0 | 20 | 0 | 0 | 20 | 49 | 2.3 | 14 | 12 |
| SAN | 80 | 0 | 0 | 10 | 0 | 0 | 10 | 0 | 10 | 49 | 2.3 | 13.5 | 13 |
| PPE | 100 | 0 | 0 | 0 | 0 | 0 | 0 | 0 | 0 | — | 2.1 | 5.6 | 14 |
| PPE | 87.5 | 0 | 0 | 0 | 0 | 0 | 5 | 7.5 | 0 | — | 1.9 | 38 | 15 |
| PPE | 75 | 0 | 0 | 0 | 0 | 0 | 10 | 15 | 0 | — | 1.9 | 41 | 16 |
| SAN | 60 | 0 | 0 | 0 | 0 | 0 | 20 | 0 | 20 | 49 | 2 | 35 | 17 |

Dy = maximum tensile strength
Ef = secant flexural modulus
Iz = Room temperature notched Izod impact strength The results are shown in the Table which demonstrates mechanical properties of engineering thermoplastics blended with amino-polyolefins, SMA copolymers and, optionally, unfunctionalized polyolefins.

Blends 1-10 are 4-component blends comprising an engineering thermoplastic, SAN, an unfunctionalized polyolefin, PP, amino-PP and SMA.

These blends show an excellent balance of mechanical properties, especially flexural modulus and impact strength.

Blends 11-13 show that SAN can be toughened by a suitable blend of amino-EPR, EPR and SMA.

Blends 15-16 show that PPE was toughened by a suitable blend of amino-EPR and SMA.

Various changes and modifications in the products and processes of this invention can be made without departing from the spirit and scope thereof. The various embodiments which have been disclosed herein were for the purpose of further illustrating the invention but were not intended to limit it.

What is claimed is:

1. An engineering thermoplastic composition, said composition excluding those comprising 50 wt % or greater styrene maleic anhydride copolymer as the engineering thermoplastic, comprising :
   (a) 5-95 wt % engineering thermoplastic at least partially compatible with styrene maleic anhydride copolymer ;
   (b) 0-95 wt % thermoplastic polymer ; and,
   (c) 2-50 wt % graft polymer comprising the reaction product of a functionalized thermoplastic polymer with styrene maleic anhydride copolymer.

2. The composition according to claim 1 wherein said engineering thermoplastic polymer is selected from the group consisting of: aliphatic or aromatic polycarbonates, polyesters, polyamides, styrene polymers, polyacetal, polyphenylene ether, acrylic ester polymers, methacrylic ester polymers, vinyl chloride polymers, vinylidene chloride polymers, vinyl fluoride polymers, and vinylidene fluoride polymers and mixtures thereof.

3. The composition according to claim 1 wherein said engineering thermoplastic composition comprises 5-50 wt % engineering thermoplastic, 50-95 wt % thermoplastic polymer and 2-25 wt % graft copolymer.

4. The composition according to claim 1 wherein said engineering thermoplastic composition comprises 50-95 wt % engineering thermoplastic, 0-40 wt % thermoplastic and 2-50 wt % graft polymer.

5. The composition according to claim 3 or 4 wherein said functionalized thermoplastic is at least partially compatible with said thermoplastic.

6. The composition according to claim 5 wherein said thermoplastic polymer is polypropylene and said functionalized thermoplastic polymer is polypropylene grafted with carboxylic acid group containing monomers.

7. The composition according to claim 4 wherein said functionalized thermoplastic comprises functionalized ethylene alpha-olefin elastomer and said thermoplastic comprises at least one member of group consisting of ethylene-alpha-olefin elastomer, polyethylene copolymer and ethylene-propylene copolymer.

* * * * *

UNITED STATES PATENT AND TRADEMARK OFFICE
CERTIFICATE OF CORRECTION

PATENT NO. : 5,244,971
DATED      : September 14, 1993
INVENTOR(S) : Dekoninck

It is certified that error appears in the above-indentified patent and that said Letters Patent is hereby corrected as shown below:

On the Title Page, under "United States Patent" please delete "Jean-Marc" and substitute therefor --Dekoninck--.

On the Title Page, after item number [75] "Inventor:" please delete the name "Dekoninck Jean-Mark" and substitute therefor the name --Jean-Marc Dekoninck--.

Signed and Sealed this

Thirteenth Day of September, 1994

Attest:

BRUCE LEHMAN

*Attesting Officer*   *Commissioner of Patents and Trademarks*